US011487609B2

(12) United States Patent
Bolisetty et al.

(10) Patent No.: US 11,487,609 B2
(45) Date of Patent: *Nov. 1, 2022

(54) SEPARATING PARITY DATA FROM HOST DATA IN A MEMORY SUB-SYSTEM

(71) Applicant: Micron Technology, Inc., Boise, ID (US)

(72) Inventors: Naveen Bolisetty, Garidepally (IN); Rajeshwar Kailash, Hyderabad (IN)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/375,301

(22) Filed: Jul. 14, 2021

(65) Prior Publication Data
US 2021/0342219 A1 Nov. 4, 2021

Related U.S. Application Data

(63) Continuation of application No. 16/717,230, filed on Dec. 17, 2019, now Pat. No. 11,099,929.

(51) Int. Cl.
*G11C 29/00* (2006.01)
*G06F 11/10* (2006.01)

(52) U.S. Cl.
CPC ...... *G06F 11/1004* (2013.01); *G06F 11/1068* (2013.01)

(58) Field of Classification Search
CPC .................. G06F 11/1004; G06F 11/1068
See application file for complete search history.

(56) References Cited

U.S. PATENT DOCUMENTS 11,099,929 B2 * 8/2021 Bolisetty ............. G06F 11/1068
2019/0361771 A1 11/2019 Koltsidas et al.

OTHER PUBLICATIONS

USPTO, Office Action for U.S. Appl. No. 16/717,230, dated Dec. 15, 2020.
USPTO, Notice of Allowance for U.S. Appl. No. 16/717,230, dated Apr. 19, 2021.

* cited by examiner

*Primary Examiner* — Samir W Rizk
(74) *Attorney, Agent, or Firm* — Lowenstein Sandler LLP

(57) ABSTRACT

A system includes a memory device including a first unit, and a processing device, operatively coupled to the memory device, to perform operations including identifying a set of parity data on a volatile memory, determining whether the set of parity data satisfies a condition pertaining to a size of the set of parity data, and responsive to determining that the set of parity data does not satisfy the condition, appending parity data to the set of parity data. The parity data is generated based on a set of host data written on the first unit.

20 Claims, 6 Drawing Sheets

SEPARATING PARITY DATA FROM HOST DATA IN A MEMORY SUB-SYSTEM

RELATED APPLICATION

The present Application is a Continuation of U.S. patent application Ser. No. 16/717,230, filed on Dec. 17, 2019, entitled "SEPARATING PARITY DATA FROM HOST DATA IN A MEMORY SUB-SYSTEM", which is incorporated herein by reference in its entirety for all purposes.

TECHNICAL FIELD

Embodiments of the disclosure relate generally to memory sub-systems, and more specifically, relate to separating parity data from host data in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
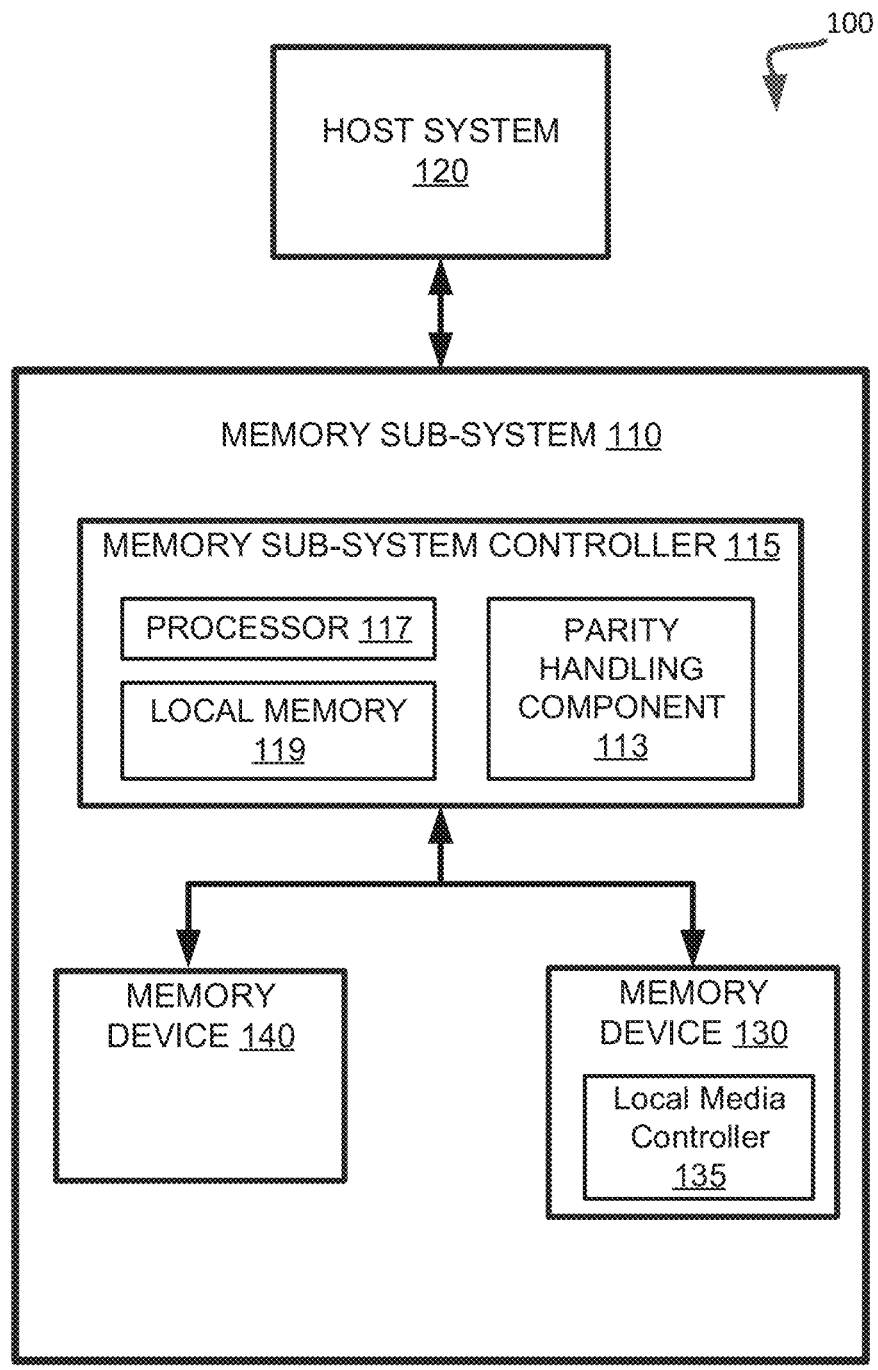
FIG. 1 illustrates an example computing system that includes a memory sub-system in accordance with some embodiments of the present disclosure.

Aspects of the present disclosure are directed to separating parity data from host data in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system.

The data to be read or written, as specified by a host request, is hereinafter referred to as "host data". A host request can include logical address information (e.g., logical block address (LBA), namespace) for the host data, which is the location the host system associates with the host data.

As the host data is stored on the memory sub-system, the memory sub-system can implement a redundancy mechanism to protect the host data against a failure of a portion of a memory device that is storing the host data. For example, for a negative-and (NAND) type flash memory device, the memory sub-system can implement a redundant array of independent NAND (RAIN) operation to provide redundancy for the data stored on the memory sub-system. For example, the memory sub-system can generate parity data when writing data received from the host system to the memory sub-system. The memory sub-system can generate the parity data based on an exclusive-or (XOR) operation with the received host data and use the parity data to reconstruct or recalculate the host data in the event of a failure of the portion of the memory device that is storing data from the host system. As an example, the memory sub-system can calculate parity data for a particular number of host data locations of a unit (e.g., a data block) of the memory sub-system. The parity data can be generated based on an XOR operation among each of the host data stored on the on the particular number of host data locations. If a portion of a memory device storing one of the host data fails and the corresponding data is lost or corrupt, then the memory sub-system can reconstruct the lost/corrupt data based on an XOR operation among the rest of the host data and the parity data.

Conventionally, parity data is stored along with the host data within the same unit of the memory sub-system. For example, host data is stored on a page stripe of a data block and parity data based on the host data is stored on the page stripe of the same data block. Striping can refer to a process of dividing a memory device into smaller segments across available portions of the memory device, such as, channels, dies, and planes. Generally, each stripe spreads across all channels, dies, and planes available in the memory device horizontally. In an example, the page stripes are typically used one after the other in a sequential manner. Each unit in a page stripe is a fixed sized (e.g., 16 KB, etc.) portion that holds data. Multiple fixed size portions for a page stripe. Striping is intended to allow parallelism (e.g., performing independent data accesses in parallel) during read, write, and erase operations. Spreading the data in stripes that are in different portions of the memory device also helps avoid losing the entire body of data if the entire body of data was to be stored on a particular portion of the memory device that fails. Thus, a page stripe can refer to a group of a specific number of data locations spread across multiple portions of the memory device that is designed to store segments of a body of data. In an example within conventional systems, each segment of host data is stored on each data location of a given page stripe of a given data block until the end of the page stripe is detected. When the end of the stripe is detected, parity data calculated based on an XOR operation among the host data stored on the data locations of the given page stripe is stored on the last location of the given page stripe on the given data block. As a result, each data block includes a plurality of page stripes that each store parity data along with host data. However, storing parity data on the page stripe on a data block along with host data decreases read performance. For example, in case of sequential host data read operations, the memory sub-system does not read data from the page stripe location that stores the parity data because it does not contain any host data. As a result, the location storing the parity data remains idle while the memory sub-system performs read operations concurrently on the rest of the data locations of the stripe that contain host data. Due to the idle time, the memory sub-system cannot reach the maximum potential for read performance (e.g., reading host data from every location available on the page stripe) because the memory sub-system reads from at least one less data location than the total available data locations on the page stripe in the time host data is concurrently read from the page stripe locations.

Aspects of the present disclosure address the above and other deficiencies by having a memory sub-system that stores host data and corresponding parity data in separate units of the memory sub-system. During host data write operations, the memory sub-system can write the host data to every available location of a page stripe of one unit (e.g., a data block) of the memory sub-system. The memory sub-system can generate a corresponding parity data based on an XOR operation performed among each of the host data on the page stripe. The memory sub-system can store the parity data on a volatile memory of the memory sub-system, instead of storing the parity data on the same page stripe of the same unit of the memory sub-system. The memory sub-system can continue to write additional host data to available locations of the additional page stripes of the same unit of the memory sub-system. The memory sub-system can accumulate, on the volatile memory, a set of parity data that are generated based on the host data stored on the page stripes. The memory sub-system can monitor the set of parity data and determine whether the set of parity data on the volatile memory satisfies a specified size condition. For example, the memory sub-system can identify whether the set of parity data is equivalent to a full page stripe worth of data. If the size condition is satisfied, the memory sub-system can store the set of parity data from the volatile memory to another page stripe of another unit of the memory sub-system, thereby separating the host data and corresponding parity data in different units of the memory sub-system. In this manner, the memory sub-system can dedicate one unit to exclusively store host data and a separate unit to exclusively store parity data. By accumulating a full page stripe worth of parity data in volatile memory, the memory sub-system can issue a parallel programming command to write the complete page stripe of data at once to improve performance, rather than switching between writing host data in one unit (e.g., block) and each individual parity data in another unit (e.g., another block) as the individual parity data is calculated. In the event of a read failure from a portion of the memory sub-system storing host data, the memory sub-system can reconstruct the host data using the set of parity data stored on the unit that exclusively stores parity data.

Advantages of the present disclosure include, but are not limited to, the increased performance of the memory sub-system due to improved read performance and memory device initialization associated with memory sub-systems, while maintaining the ability to provide data protection using a redundancy operation. As a result of storing the parity data separately from the host data, the memory sub-system can store host data exclusively on a particular unit of the memory sub-system, which allows the memory sub-system to read concurrently from every data location of the page stripes of the unit without incurring any idle time associated with any data location. The elimination of idle time allows the memory sub-system to achieve maximum possible sequential read performance. Additionally, the memory sub-system can maintain a list of relationship between data locations storing host data and parity data in separate units (e.g., separate block). As a result, at device initialization time, the memory sub-system can use the list to identify data locations that contain host data, thereby eliminating the need for scanning all data locations available on the device to identify which locations contain host data. Thus, device initialization time can be improved and valuable computing resources are not wasted on unnecessarily scanning all data locations.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-systems 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transitor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a parity handling component 113 that can store parity data corresponding to host data to a unit of the memory sub-system 110 that is separate from another unit that stores the host data. In some embodiments, the memory sub-system controller 115 includes at least a portion of the parity handling component 113. For example, the memory sub-system controller 115 can include a processor 117 (processing device) configured to execute instructions stored in local memory 119 for performing the operations described herein. In some embodiments, the parity handling component 113 is part of the host system 110, an application, or an operating system.

The parity handling component 113 can store parity data corresponding to host data received from host system 120 in a unit of the memory sub-system that is separate from another unit storing the host data. The memory sub-system 110 can write the host data to each available location of a page stripe of one unit (e.g., a data block) of the memory sub-system 110. Once the page stripe is full, the parity handling component 113 can generate a corresponding parity data based on an XOR operation performed among each of the host data on the page stripe. The parity handling component 113 can store the parity data on a volatile memory of the memory sub-system. The memory sub-system 110 can continue to write additional host data to additional page stripes of the memory sub-system 110. The parity handling component 113 can append (e.g., accumulate) additional parity data based on host data on the additional page stripes to a set of parity data on the volatile memory. Controller 115 can check to determine whether a size condition is met, such as, whether the size of the set of parity data on the volatile memory is equal to or larger than the size of a full page stripe worth of data. If the size condition is met, Controller 115 can store the set of parity data from the volatile memory to another page stripe of another unit of the memory sub-system 110. In this manner, controller 115 can separate the host data and the corresponding parity data in separate units of the memory sub-system 110. During sequential read requests, memory sub-system 110 can perform read operations on all available data locations of the unit storing the host data without incurring any idle time associated with storing parity data on the unit. In the event of a read failure from a portion of the memory sub-system 110 storing the host data, the memory sub-system 110 can reconstruct the host data using the set of parity data stored on the unit that exclusively stores parity data.

Figure 2:
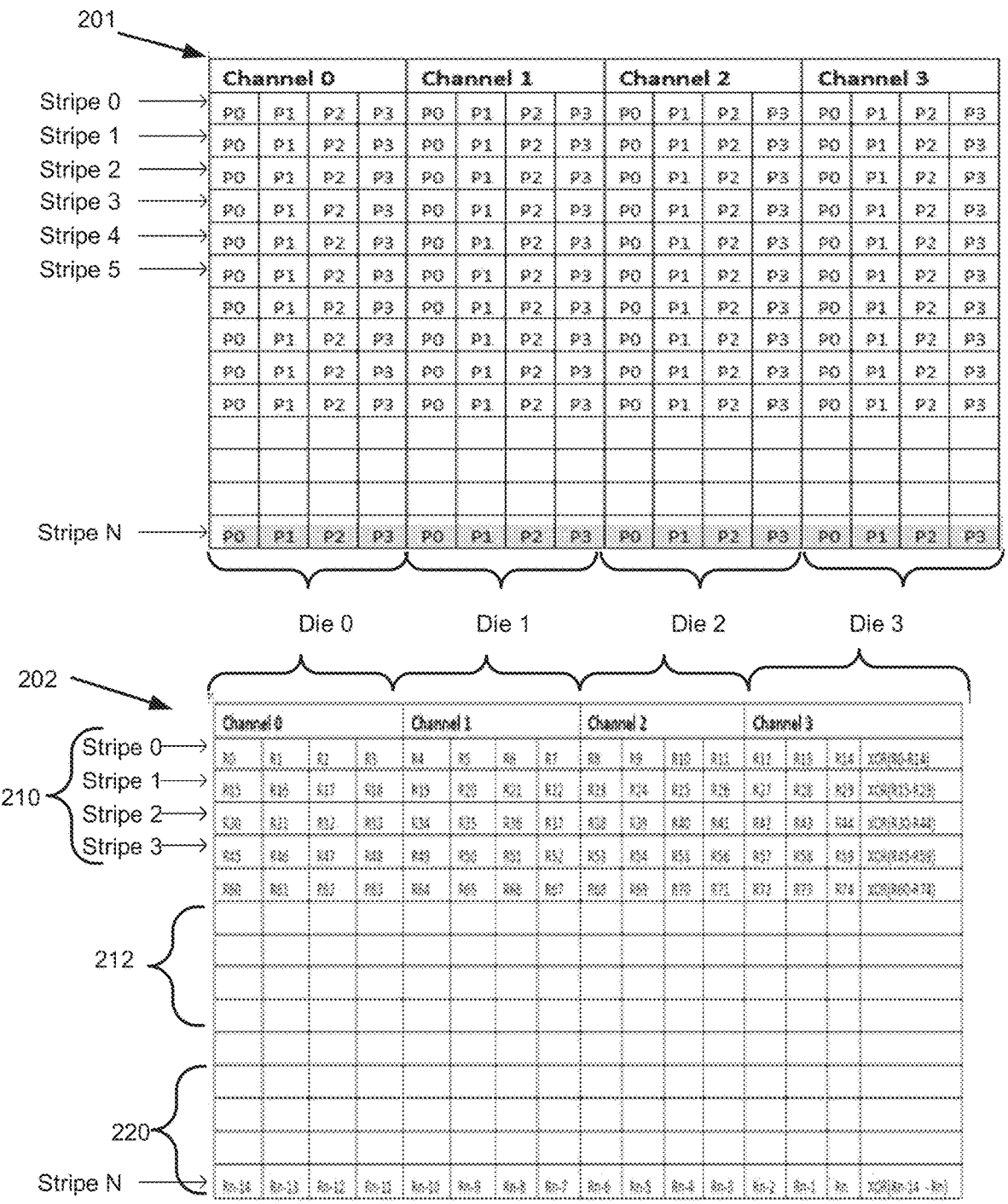
FIG. 2 is an example of separating host and parity data in different memory sub-system units, in accordance with some embodiments of the present disclosure.

FIG. 2 illustrates an example of separating host data and parity data in different units, unit 201 and unit 202 of a memory sub-system (such as, memory sub-system 110 of FIG. 1), in accordance with some embodiments of the present disclosure. Elements of computing environment 100 of FIG. 1 can be used to help illustrate FIG. 2. In the example of FIG. 2, particular architecture of an example memory sub-system unit 201 and unit 202 are illustrated.

In some implementations, memory device 130 of memory sub-system 110 can include a set of logical unit numbers (LUN) (not labeled). In some implementations, each LUN of a set of LUNs has a same amount of memory. In some implementations, a LUN can correspond to a particular granularity of memory, such as, a die of a memory device 130. A die is the smallest unit that can independently execute commands. A single memory device 130 can include one or more die configured in a discrete package. In the illustrated example, the memory sub-system 110 includes four die (e.g., die 0 through die 3).

In some implementations, a LUN can correspond to a different granularity of memory, such as, a plane within a die. Identical and concurrent operations can take place on each plane. A single die can include one or more planes. As illustrated in FIG. 2, die 0 includes four planes, P0 through P3. In the illustrated example, a memory device includes 4 die and each die includes 4 planes.

In some implementations, a data can be "striped" across multiple portions of a memory device 130, such as across multiple LUNs of a set of LUNs. Striping (also referred to as "page striping" herein) can refer to a process of dividing a memory device into smaller segments across available portions of the memory device, such as, channels, dies, and planes. Generally, each stripe spreads across all channels, dies, and planes available in the memory device horizontally. In an example, the page stripes are typically used one after the other in a sequential manner. Each unit in a page stripe is a fixed sized (e.g., 16 KB, etc.) portion that holds data. Multiple fixed size portions for a page stripe. Striping is intended to allow parallelism (e.g., performing independent data accesses in parallel) during read, write, and erase operations. In an example, if a LUN is defined to represent planes, then the data can be striped across multiple planes. The group of data locations storing the striped data is referred to as a page stripe. In another example, the particular striping technique can stripe data across different die. As illustrated in FIG. 2, the data to be stored in the memory device is striped across different planes. For example, controller 115 can receive host data from host system 120. A write operation can be performed on the received data in a manner where controller 115 stripes the data across portions of the memory device. For instance, the data can be written on plane 0 of die 0, plane 1 of die 0, plane 2 of die 0, plane 3 of die 0, and so forth until the data has been written to memory device 130 in its entirety. The group of data locations that are used to store the striped data across multiple LUNs can be referred to as a page stripe. In the example illustrated, stripe 0 through stripe N are shown for striping host data across the memory device. For example, host data is striped across plane 0 through plane 3 of die 0 through die 3 on stripe 0. Thus, each stripe is shown to include a total of 16 planes. The units 201 and 202 can include a total of 64 page stripes (e.g., stripe 0 through stripe N).

In some implementations, a LUN of a memory device 130 can be divided into smaller units of memory. For example, a LUN can include multiple blocks of memory. A block (also referred to as "data block" herein) of memory can refer to a smallest unit of a memory device 130 that can be erased responsive to an erase operation. A block of memory can include multiple pages of memory. A page of memory can refer to a smallest unit of a memory device 130 that can be written responsive to a write operation. In the example illustrated, unit 201 can represent a data block of memory, such as, "block A." Similarly, unit 202 can represent another data block of memory, "block B." Die 0 of memory device 130 can include block A, block B, block N, etc.

In some implementations, a channel can refer to a connection or coupling between two elements of a computing environment, such as connection or coupling between controller 115 and memory device 130. In some implementations, channels can be used by controller 115 to communicate with memory devices 130,140, etc. For example, controller 115 can perform one or more memory operations, such as a write operation, read operation, erase operation, a mapping operation, or garbage collection, on memory device 130. For instance, controller 115 can perform a write operation to write data received from host system 120 to respective LUNs of the memory device using the appropriate channels. In the illustrated example, four channels (e.g., channel 0 through channel 3) are shown for unit 201, where each die has a corresponding channel.

In an implementation, as the memory sub-system 110 received host data from host 120 to be written to the memory sub-system 110, a cursor can be used to keep track at which location of the data stripe the received data is being stored. A cursor can be a software, a hardware, or a combination thereof to manage execution of a memory operation. The memory sub-system 110 can include an XOR calculator to perform an XOR operation as the memory sub-system writes the data to each location of a given stripe on a given memory unit (e.g., P0, P1, etc. of die 0 corresponding to stripe 0 of block A). For example, the XOR calculator may recalculate a running parity data every time a new data element is to be written to a new location of the page stripe to include the new data element in the parity calculation, until the cursor is at the end of the stripe (e.g., P3 of die 3 corresponding to stripe 0). In some example, a BIN (e.g., a buffer memory in volatile memory), corresponding to an active page stripe where memory sub-system performs host writes, can be used to store the running parity data in a volatile memory, such as, in an SRAM (static random access memory). The controller can maintain multiple BINS, according to the requirement of the memory sub-system. When the cursor reaches the end of the stripe, the memory sub-system 110 can write the host data to the last location of the stripe, calculate the parity data (e.g., R0) for the entire stripe (e.g., all 16 planes of stripe 0), and store the parity data in volatile memory, such as, in a DRAM (dynamic random access memory). The volatile memory can provide for fast access and calculation for the data. The memory sub-system can start storing the next set of host data on the next page stripe (e.g., stripe 1), use the next BIN in volatile memory to calculate running parity data as the memory sub-system stores the next set of data, and store the parity data (e.g., R1) corresponding to the next set of host data stored on the entire next page stripe (e.g., stripe 1) on volatile memory along with the previously stored parity data (e.g., R0) corresponding the host data on the previous page stripe (e.g., stripe 0). The memory sub-system can continue to store additional sets of host data on additional page stripes (e.g., stripes 2, 3, 4, etc.) and store additional parity data (e.g., R2, R3, R4, etc.) corresponding to the respective page stripes to the volatile memory. The memory sub-system can append the additional parity data (e.g., R2, R3, R4) to a set of the parity data (e.g., R0 and R1) that was previously stored on the volatile memory. Thus, the memory sub-system can accumulate and preserve the updated set of parity data, including the additional parity data, in the volatile memory.

In an implementation, the memory sub-system keeps track of the set of parity data stored on the volatile memory. The memory sub-system, either continuously or in certain intervals, assesses the set of parity data (e.g., R0, R1, R2, R3, etc.) stored in the volatile memory to determine whether the set of parity data satisfies a size condition. In some implementation, the memory sub-system can determine whether a size of the set of parity data is equal to or larger than a specified size. In an example, the specified size can be the size of one full page worth of data of a memory unit. In another example, the size can be specified in terms of kilobytes of memory. In some implementation, the memory sub-system can determine whether a number of pages holding the set of parity data is equal to or greater than a specified number of pages. For example, the specified number can be the number of pages of one page stripe on a memory unit (e.g., block B). In another example, the number can be specified in terms of a predetermined number (e.g., 15 or 16 pages, etc.).

In some implementations, when the memory sub-system determines that the set of parity data does not satisfy the size condition, the memory sub-system continues to accumulate and preserve additional parity data to the set of parity data on volatile memory based on respective host data stored in corresponding page stripes until the size condition is satisfied.

In some implementations, when the memory sub-system determines that the set of parity data satisfies the size condition, the memory sub-system can store the set of parity data saved on the volatile memory to another unit of the memory device 130. For example, the memory sub-system can determine that the set of parity data (e.g., R0-R14) satisfies a size condition, such as, the size of the set of parity data equals to one full page stripe worth of data of memory unit 202 (e.g., block B). Alternatively, the memory sub-system can determine that the number of pages holding the set of parity data (e.g., R0-R14) is equal to 15 pages of data. Responsive to the determination of satisfying the size condition, as shown in FIG. 2, the memory sub-system can store the set of parity data (e.g., R0-R14) on a page stripe (e.g., stripe 0) of unit 202 (e.g., block B) of the memory device 130, which is a different unit than unit 201. As such, memory sub-system 110 can separate host data and parity data in different memory units. Once the set of parity data is stored in the different unit of memory device 130, the set of parity data is removed from volatile memory and a new cycle of calculating a different set of parity data for a different set of host data can begin. As the size of the new set of parity data satisfies the size condition, the new set of parity data can be stored on the next stripe (e.g., stripe 1) of unit 202.

In some implementations, memory sub-system can designate a unit (e.g., a block) for storing exclusively host data and/or a separate unit designated for storing exclusively parity data. In some examples, the memory sub-system can store sets of parity data corresponding to different units (e.g., different blocks) of the memory device 130 within the unit (e.g., unit 202) dedicated to storing exclusively parity data. For example, portions 210, 212, and 220 of unit 202 can store parity data corresponding to blocks A, B, and Z, respectively. The memory sub-system can reconstruct a piece of host data of the set of host data stored on the unit 201 using a corresponding parity data of the set of parity data stored on unit 202 when the piece of host data is not readable from unit 201 in case of a failure associated with the memory device 130.

In some implementations, the specified size for the size condition can be a predetermined amount less than one full page stripe worth of data. In some implementations, the specified number of pages for the size condition can be a predetermined number of pages less than the number of pages on a full page stripe. These types of size conditions can be defined for accommodating storage of a parity value corresponding to the set of parity data stored on the block dedicated to storing parity data. For example, as shown in FIG. 2, the last plane of die 3 of stripe 0 of unit 202 is used to store parity data based on XOR operation among the set of parity data in the previous planes of stripe 0 (R0-R14). The parity value corresponding to the set of parity data can be used to recover parity data of the set of parity data in case of a failure of a data location storing the parity data.

In some implementations, instead of storing the set of parity data when a size condition is satisfied, the parity data can be stored in a separate unit from the host data as soon as a full page worth of host data is stored on the host data unit. That is, for example, after host data is stored in the full page stripe 0 and the parity data corresponding to stripe 0 of unit 201 is calculated, the parity data can be stored at die 0, plane 0 of stripe 0 in unit 202. The parity data corresponding to the full page stripe 0 can be stored in unit 202 without storing it first I the volatile memory, which can avoid accumulating the parity data until a full page stripe worth of parity data is accumulated, thereby avoiding large capacity in the volatile memory.

Figure 3:
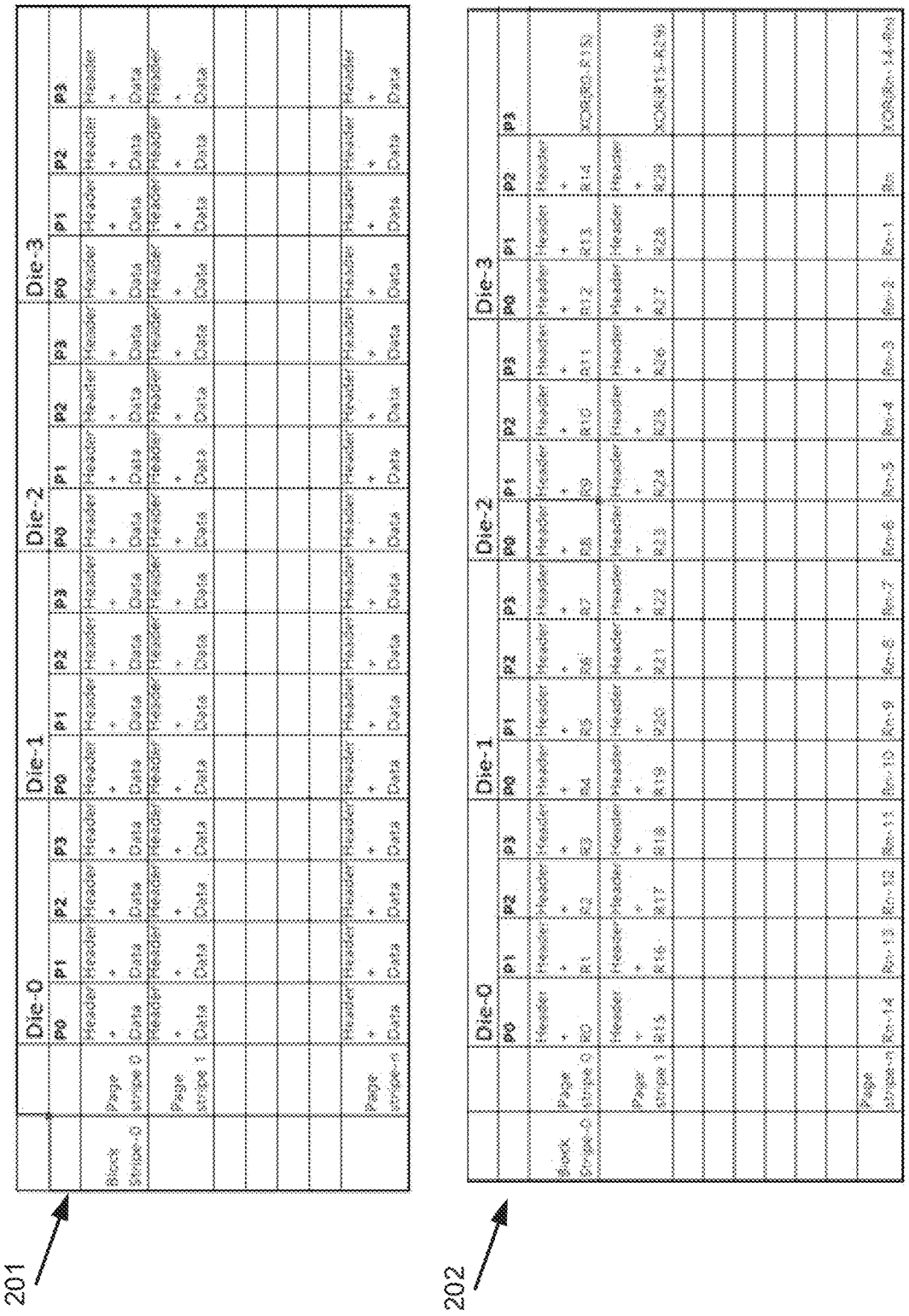
FIG. 3 is an example of a relationship between separated host and parity data in different memory sub-system units, in accordance with some embodiments of the present disclosure.

FIG. 3 is an example of a relationship between separated host data and parity data in different memory sub-system units, in accordance with some embodiments of the present disclosure. In an implementation, the memory sub-system can implement a mechanism to create relationships between host data stored in a particular page stripe of one memory unit to parity data on a different memory unit that corresponds to the particular page stripe of host data. In some example, the memory sub-system can utilize additional fields in the page headers of the pages storing the host data and parity data. The additional fields can be used to identify where the corresponding parity data is stored, and vice versa. For example, FIG. 3 shows that plane P0 of Die-0 corresponding to page stripe 0 of unit 201 (e.g., block A) includes "Header+Data" and that plane P0 of Die-0 corresponding to page stripe 0 of unit 202 (e.g., block B) includes "Header+R0." As the memory sub-system 110 writes host data in unit 201, the memory sub-system can add extra fields for including corresponding parity data location within the header. For the example illustrated in FIG. 2, the header information can include the following:

For Page stripe 0 at (Die-0-Die-3) (P0-P3), header points to "Unit 202, Page stripe 0, Die 0, P 0;

For Page stripe 1 at (Die-0-Die-3) (P0-P3), header points to "Unit 202, Page stripe 0, Die 0, P 1;

For Page stripe 2 at (Die-0-Die-3) (P0-P3), header points to "Unit 202, Page stripe 0, Die 0, P 2;

For Page stripe 3 at (Die-0-Die-3) (P0-P3), header points to "Unit 202, Page stripe 0, Die 0, P3.

On the other hand, as the memory sub-system 110 writes parity data in unit 202, the memory sub-system can add extra fields within each page header for including corresponding host data location based on which the parity data at the page is generated. For the example illustrated in FIG. 2, the header information in the parity data page can include the following:

For Page stripe 0, Die-0, P0 (e.g., parity R0), header points to parity derived from "Unit 201, Page stripe 0";

For Page stripe 0, Die-0, P1 (e.g., parity R1), header points to parity derived from "Unit 201, Page stripe 1";

For Page stripe 0, Die-0, P2 (e.g., parity R2), header points to parity derived from "Unit 201, Page stripe 2";

For Page stripe 0, Die-0, P3 (e.g., parity R3), header points to parity derived from "Unit 201, Page stripe 3".

In the event of a read failure on a portion of the memory device storing the host data, the memory sub-system can refer to the header fields to identify where the corresponding parity data is located, and use the parity data to reconstruct the host data.

In some implementation, the relationship identified between the host data and the parity data can be used to improve device initialization. For example, the memory sub-system can store the relationship information available in the parity data page headers in a control structure (e.g., a file) with a pre-allocated file ID for later usage. Since the parity data page headers point to every block location from which the parity data is generated, a complete list of all data locations storing host data in the memory device is available in the parity page headers corresponding to the full set of parity data. At the time of memory device initialization for performing a memory operation, the memory sub-system can skip scanning all the data blocks to identify data block locations that store programmed data and instead use the control structure to identify the data block locations storing host data. Use of the control structure, as a result, can save time that would have been otherwise spent during device initialization.

Figure 4:
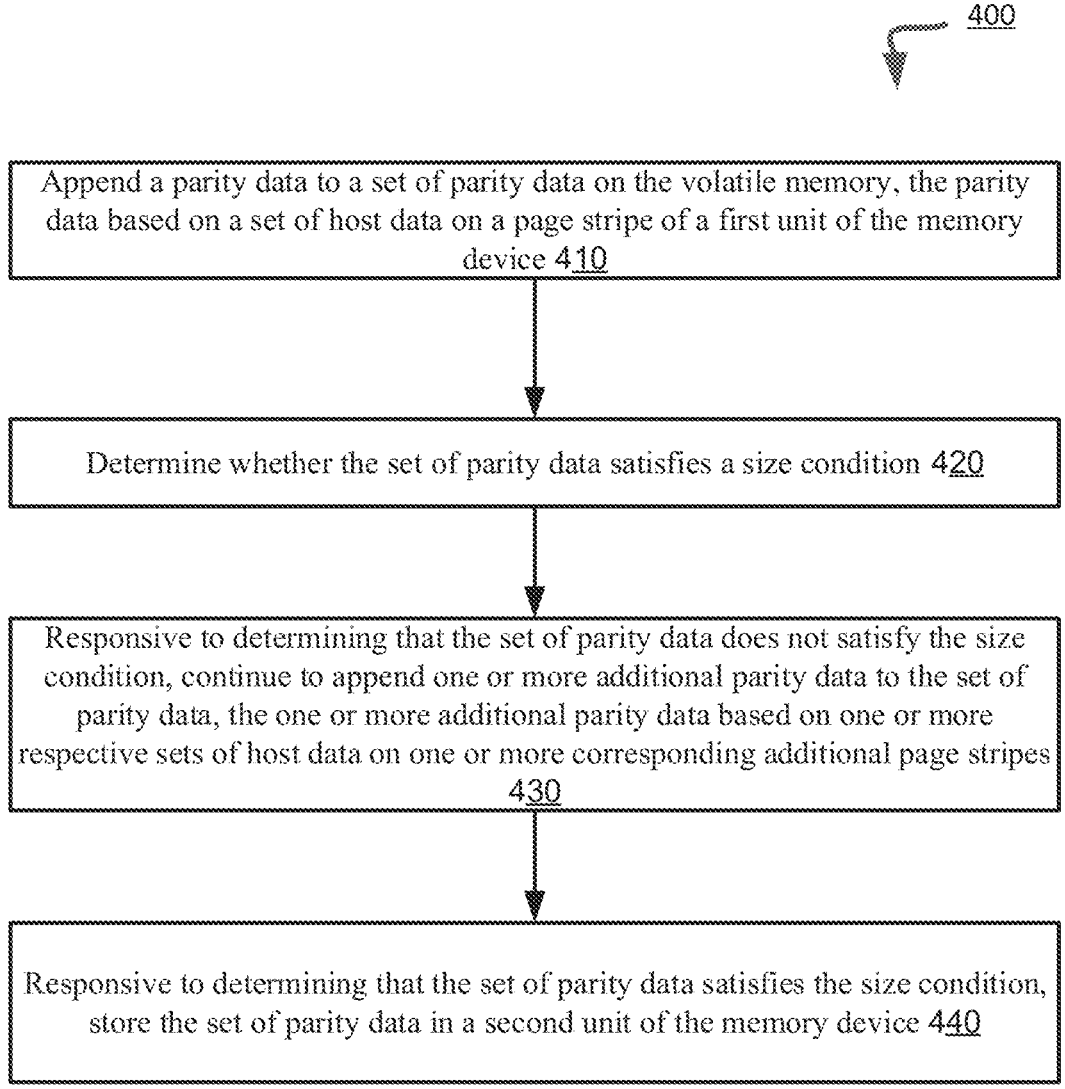
FIG. 4 is a flow diagram of an example method to store parity data in a volatile memory until a size condition is satisfied before separating parity and host data in different units of a memory device, in accordance with some embodiments of the present disclosure.

FIG. 4 is a flow diagram of an example method to store parity data in a volatile memory until a size condition is satisfied before separating parity and host data in different units of a memory device, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the parity handling component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic accumulates parity data to a set of parity data on the volatile memory, the parity data based on a set of host data on a page stripe of a first unit of the memory device. In some example, the volatile memory can include an SRAM or a DRAM. In some example, the parity data is generated based on an XOR operation performed among the set of host data on the page stripe. In some examples, the parity data can be a Redundant Array of Independent NAND (RAIN) parity data.

At operation 420, the processing logic determines whether the set of parity data satisfies a size condition. In some examples, the set of parity data satisfies the size condition when a first size of the set of parity data is equal to or larger than a second size of a full page stripe of data on the second unit. In some other examples, the set of parity data satisfies the size condition when a first number of pages holding the set of parity data is equal to or greater than a second number of pages of one page stripe on the second unit.

At operation 430, the processing logic, responsive to determining that the set of parity data does not satisfy the size condition, continues to append additional parity data to the set of parity data, the additional parity data based on one or more respective sets of host data on one or more corresponding additional page stripes. In some examples, the first unit is dedicated to holding exclusively host data.

At operation 440, the processing logic, responsive to determining that the set of parity data satisfies the size condition, stores the set of parity data in a second unit of the memory device. In some examples, the first unit is different from the second unit. In some examples, the second unit is dedicated to holding exclusively parity data. Furthermore, the processing logic reconstructs host data of the set of host data stored on the first unit using a corresponding parity data of the set of parity data on the second unit when the host data is not readable from the first unit.

Figure 5:
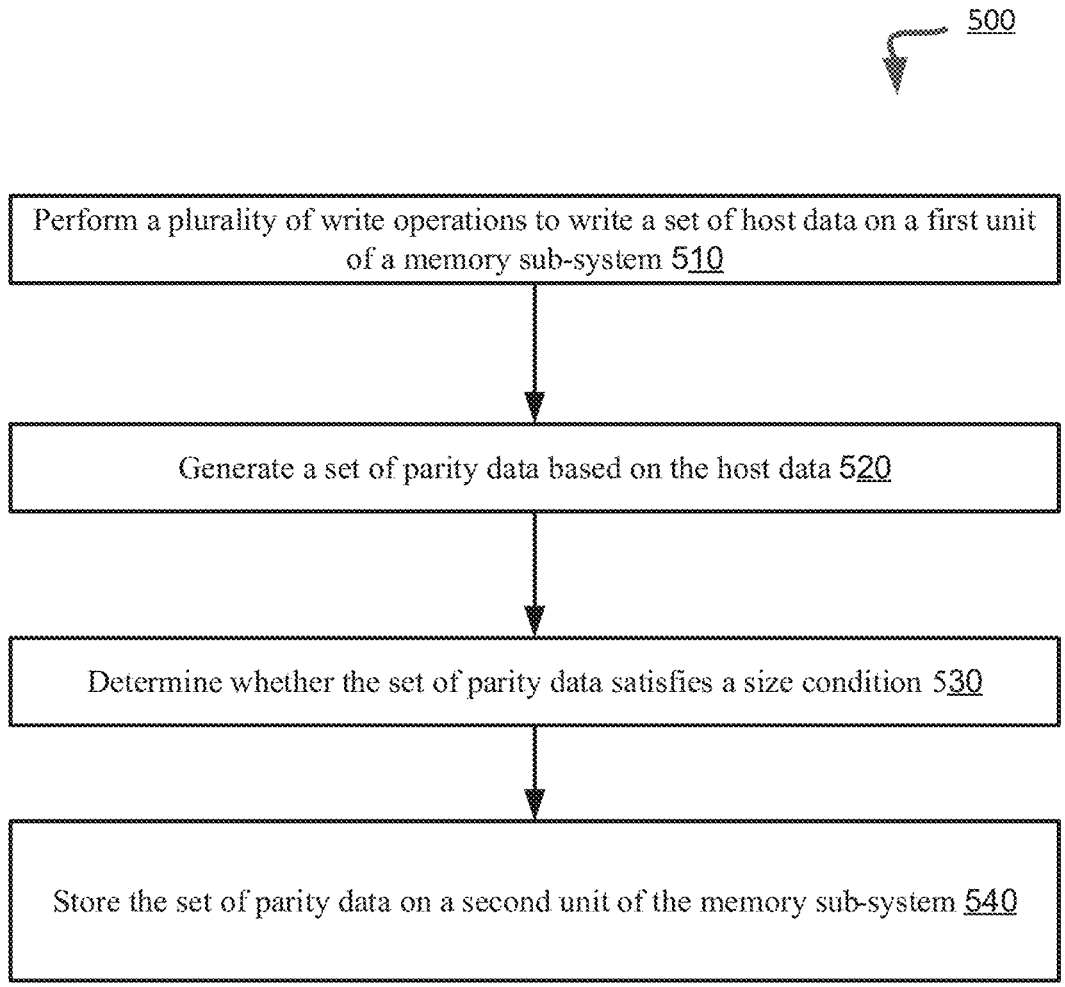
FIG. 5 is a flow diagram of an example method to separate parity data from host data in a memory sub-system in accordance with some embodiments of the present disclosure.

FIG. 5 is a flow diagram of an example method 500 to separate parity data from host data in a memory sub-system, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the parity handling component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic performs a plurality of write operations to write a set of host data on a first unit of a memory sub-system. In some examples, the first unit can represent a data block. At operation 520, the processing logic generates a set of parity data based on the host data. In some examples, the parity data can be a Redundant Array of Independent NAND (RAIN) parity data.

At operation 530, the processing logic determines whether the set of parity data satisfies a size condition. In some examples, the set of parity data satisfies the size condition when a first size of the set of parity data is equal to or larger than a second size of a full page stripe of data on the second unit. In some examples, the set of parity data satisfies the size condition when a first number of pages holding the set of parity data is equal to or greater than a second number of pages of one page stripe on the second unit.

At operation 540, the processing logic stores the set of parity data on a second unit of the memory sub-system. In some examples, the first unit is different from the second unit. In some examples, the first unit is dedicated to holding exclusively host data. In some examples, the second unit is dedicated to holding exclusively parity data. Furthermore, responsive to determining that the set of parity data does not satisfy the size condition, the processing logic stores the set of parity data on a random access memory. Moreover, the processing logic reconstructs host data of the set of host data stored on the first unit using parity data of the set of parity data on the second unit when the host data is not readable from the first unit.

Figure 6:
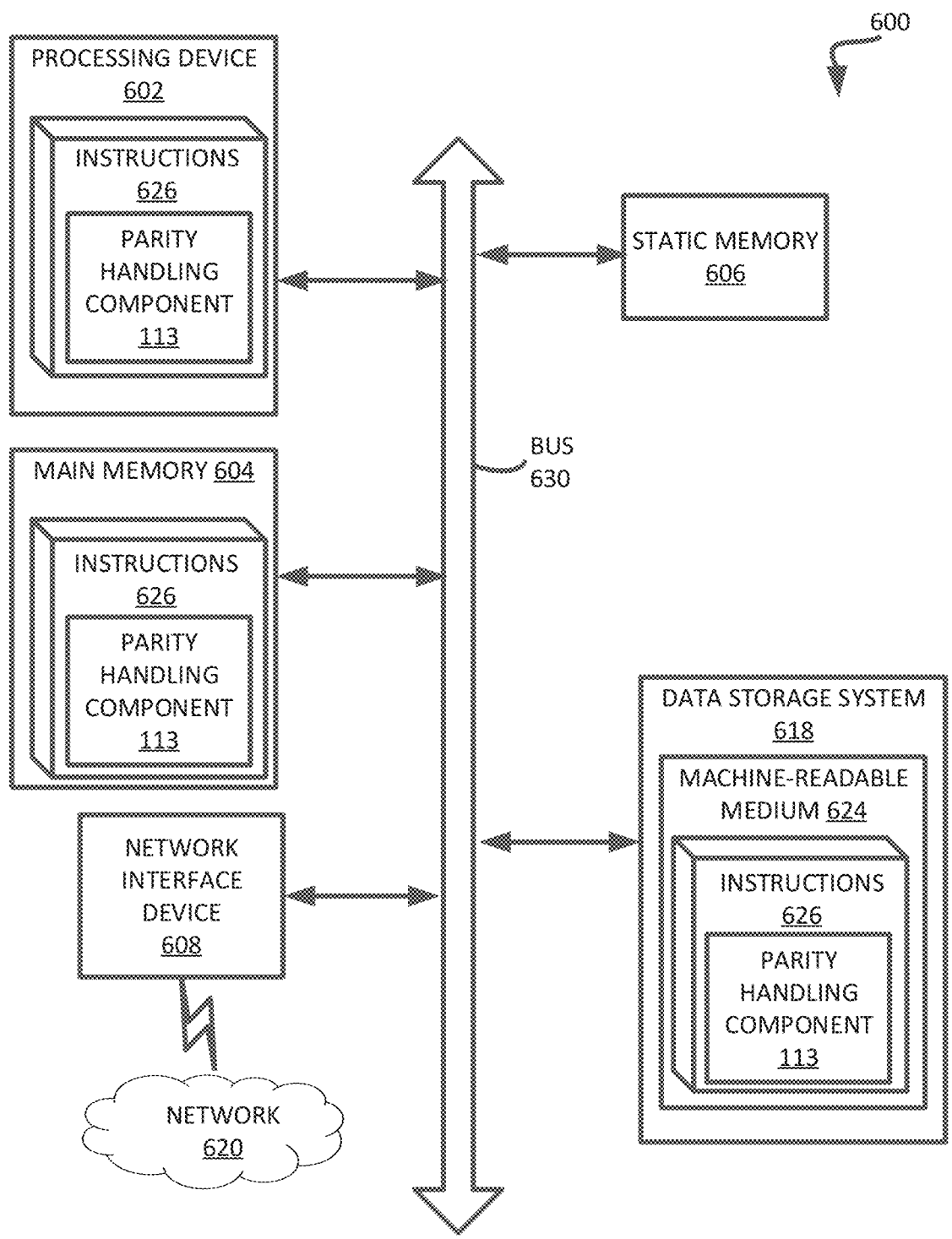
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the parity handling component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a parity handling component (e.g., the parity handling component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device comprising a first unit;
a processing device, operatively coupled with the memory device, to perform operations comprising:
identifying a set of parity data on a volatile memory;
determining whether the set of parity data satisfies a condition pertaining to a size of the set of parity data; and
responsive to determining that the set of parity data does not satisfy the condition, appending additional parity data to the set of parity data, wherein the additional parity data is generated based on a set of host data written on the first unit.

2. The system of claim 1, wherein the operations further comprise:
responsive to determining that the set of parity data satisfies the condition, storing the set of parity data in a second unit of the memory device different from the first unit.

3. The system of claim 2, wherein determining that the set of parity data satisfies the condition comprises determining that the size of the set of parity data is equal to or larger than a size of a full page stripe of data on the second unit.

4. The system of claim 2, wherein determining that the set of parity data satisfies the condition comprises determining that a first number of pages holding the set of parity data is equal to or greater than a second number of pages of one page stripe on the second unit.

5. The system of claim 2, wherein the operations further comprise:
determining that the set of host data is not readable from the first unit; and
in response to determining that the set of host data is not readable from the first unit, reconstructing the set of host data using parity data of the set of parity data on the second unit.

6. The system of claim 1, wherein the first unit is dedicated to holding host data.

7. The system of claim 2, wherein the second unit is dedicated to holding parity data.

8. A method comprising:
generating, by a processing device, a set of parity data based on a set of host data, wherein the set of host data is written on a first unit of a memory device;
determining, by the processing device, whether the set of parity data satisfies a condition pertaining to a size of the set of parity data; and
responsive to determining that the set of parity data satisfies the condition, storing, by the processing device, the set of parity data on a second unit of the memory device different from the first unit.

9. The method of claim 8, further comprising:
responsive to determining that the set of parity data does not satisfy the condition, storing, by the processing device, the set of parity data on a random access memory.

10. The method of claim 8, further comprising:
determining, by the processing device, that the set of host data is not readable from the first unit; and
in response to determining that the set of host data is not readable from the first unit, reconstructing, by the processing device, the set of host data using parity data of the set of parity data on the second unit.

11. The method of claim 8, wherein determining that the set of parity data satisfies the condition comprises determining that the size of the set of parity data is equal to or larger than a size of a full page stripe of data on the second unit.

12. The method of claim 8, wherein determining that the set of parity data satisfies the condition comprises determining that a first number of pages holding the set of parity data is equal to or greater than a second number of pages of one page stripe on the second unit.

13. The method of claim 8, wherein the first unit is dedicated to holding host data.

14. The method of claim 8, wherein the second unit is dedicated to holding parity data.

15. A non-transitory computer-readable storage medium comprising instructions that, when executed by a processing device, cause the processing device to perform operations comprising:
identifying a set of parity data on a volatile memory, wherein the set of parity data is generated based on a set of host data written on a first unit of a memory device;
determining whether the set of parity data satisfies a condition pertaining to a size of the set of parity data; and
responsive to determining that the set of parity data satisfies the condition, storing the set of parity data in a second unit of the memory device different from the first unit.

16. The non-transitory computer-readable storage medium of claim 15, wherein the operations further comprise:
determining that the set of host data is not readable from the first unit; and
in response to determining that the set of host data is not readable from the first unit, reconstructing the set of host data using parity data of the set of parity data on the second unit.

17. The non-transitory computer-readable storage medium of claim 15, wherein the set of parity data satisfies the condition when the size of the set of parity data is equal to or larger than a size of a full page stripe of data on the second unit.

18. The non-transitory computer-readable storage medium of claim 15, wherein the set of parity data satisfies the condition when a first number of pages holding the set of parity data is equal to or greater than a second number of pages of one page stripe on the second unit.

19. The non-transitory computer-readable storage medium of claim 15, wherein the operations further comprise:
responsive to determining that the set of parity data does not satisfy the condition, appending additional parity data to the set of parity data.

20. The non-transitory computer-readable storage medium of claim 15, wherein the first unit is dedicated to holding host data and the second unit is dedicated to holding parity data.

* * * * *